Aug. 29, 1950  F. GROSS  2,520,764
PICKUP DEVICE FOR CORNCOBS AND THE LIKE
Filed Aug. 25, 1947  2 Sheets-Sheet 1
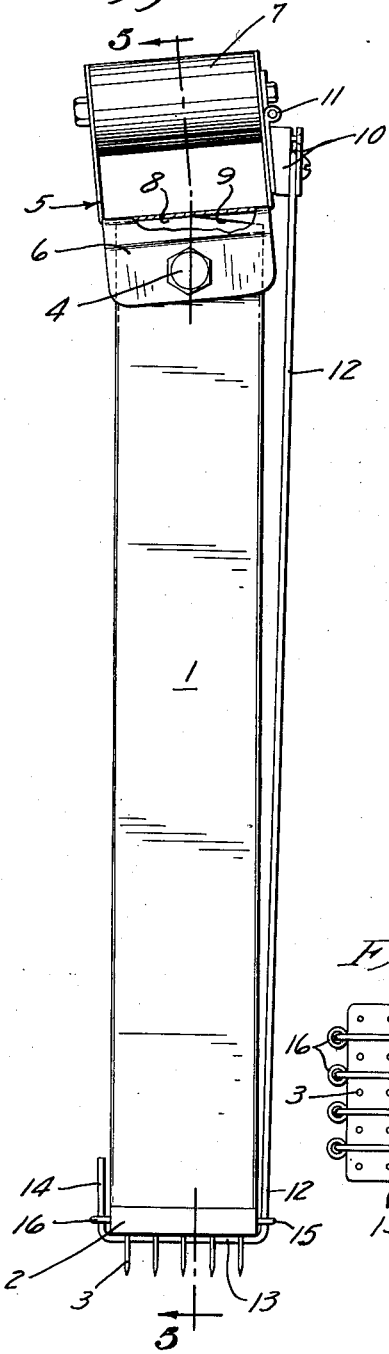
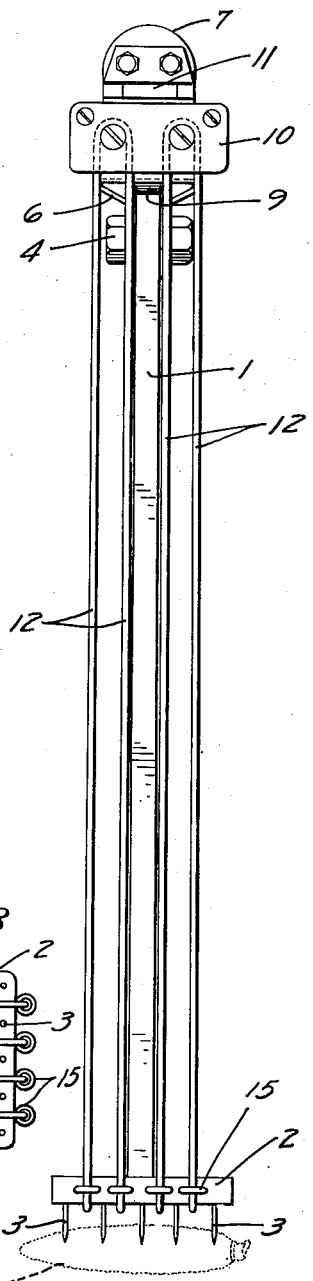
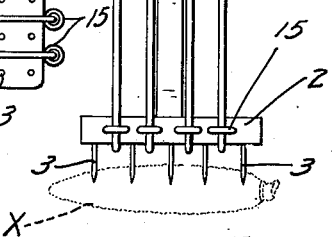
Inventor
Frank Gross
By his Attorneys
Merchant & Merchant Aug. 29, 1950   F. GROSS   2,520,764
PICKUP DEVICE FOR CORNCOBS AND THE LIKE
Filed Aug. 25, 1947   2 Sheets-Sheet 2

Inventor
Frank Gross
By his Attorneys
Merchant & Merchant

Patented Aug. 29, 1950

2,520,764

UNITED STATES PATENT OFFICE 2,520,764

PICKUP DEVICE FOR CORNCOBS AND THE LIKE

Frank Gross, Hutchinson, Minn.

Application August 25, 1947, Serial No. 770,412

2 Claims. (Cl. 294—61)

My invention relates generally to pick-up devices and more specifically to a device for picking up and releasing articles such as corn cobs and the like from the ground.

The primary object of my invention is the provision of a device which will enable a user to rapidly pick up and dispose of articles such as corn cobs or the like without stooping and with a minimum of effort.

Another highly important object is the provision of such a pickup device having a stripper element operated by movements of the handle of the device whereby to eliminate additional stripper actuating mechanism such as a separate hand lever.

A still further object of my invention is the provision of such pickup device which is simple and inexpensive to build, rugged in construction, light in weight, and durable in use.

Still further objects and advantages will become apparent from the following specification, appended claims, and attached drawings.

Referring to the drawings in which like characters indicate like parts throughout the several views:

Fig. 1 is a view in side elevation of my device;

Fig. 2 is a view in front elevation as seen from the right with respect to Fig. 1;

Fig. 3 is a bottom plan of my pick-up device;

Referring with greater detail to the drawings, the numeral 1 indicates a shank, to one end of which is rigidly secured a head in the nature of a plate 2. The plate 2 is provided with a plurality of spaced tines 3 which project outwardly therefrom in a direction longitudinally of the shank 1. The tines 3 are arranged in parallel rows for a purpose which will hereinafter become apparent.

Figure 4:
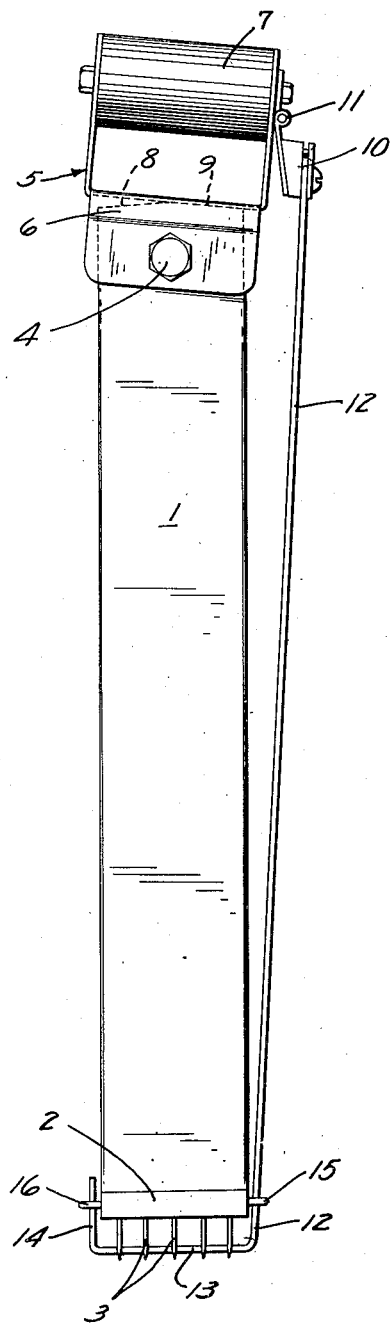
Fig. 4 is a view corresponding to Fig. 1, but showing a different position of some of the parts.
Figure 5:
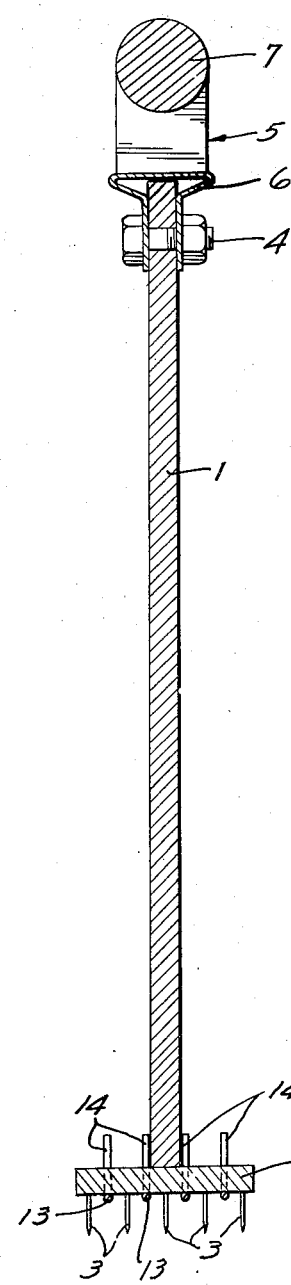
Fig. 5 is a longitudinal section taken on the line 5—5 of Fig. 1.

On the opposite end of the shank 1 is pivotally mounted by means of a nut-equipped bolt 4, a handle indicated in its entirety by the numeral 5. The handle 5 comprises a handle bracket 6 and a hand grip 7 rigidly attached thereto. It will readily be seen by reference to Figs. 1 and 4 that the end of the shank 1 is beveled to provide stop surfaces 8 and 9 which are adapted to engage a portion of the handle bracket 6 to limit pivotal movements of the handle 5.

An anchoring element in the form of a clamp 10 is pivotally secured to the handle bracket 6 by means of a hinge 11. Adjustably secured within the clamp 10 are the upper closed intermediate portions of a pair of inverted U-shaped members 12 which extend longitudinally of the shank 1 to a point slightly beyond the outer plane of the plate 2. At this point, the members 12 are bent to form stripper rods 13 which extend transversely of and adjacent the outer surface of the plate 2 between adjacent rows of the tines 3. At their end portions 14, the stripper rods 13 are formed to extend longitudinally of the shank 1 toward the handle member 5. The rods 12 and end portions 14 extend through and are loosely slidably retained by guides in the form of screw eyes 15 and 16 respectively, secured to opposite sides of the head 2. It will be seen by reference to Fig. 1 that when the handle 5 is in the position of Fig. 1, the handle bracket 6 engages the stop surface 8 of the shank 1 and the stripper rods 13 are in a retracted inoperative position; and when the handle 5 is moved to the position of Fig. 4, with the bracket 6 engaging the stop surface 9 of the shank 1, the stripper rods 13 are moved to the extended material stripping position shown in Fig. 4.

In use, such as in the removal of corn cobs from the ground within a hog pen or the like, the operator merely, by holding the hand grip 7, impales a corn cob or the like $x$ upon the tines 3. At this time, the stripper rods 13 are in a retracted inoperative position (see particularly Fig. 2). The user then holds the device over a suitable receptacle, such as a wheel barrow or the like, not shown, and by a simple snap wrist motion moves the handle 5 to the position of Fig. 4 which causes the rods 12, together with the stripper 13 thereof, to move to the operative material stripping position of Fig. 4, thereby effectively removing the cob $x$ from the tines 3.

It has been found that when the cob $x$ has been impaled by the tines 3, an outward and upward swinging motion imparted to the device with a subsequent wrist action by the user may cause the cob $x$ to be tossed to a relatively distant receptacle (not shown) with great accuracy and with a minimum of effort. In fact, the operator by simply holding the wrist motionless at the termination of the upward swinging motion thereof will permit an automatic stripping action caused by inertia of the upwardly moving device.

My invention, being light in weight and simple to operate, has been found in use to be of great value as a time and labor saving device.

While I have illustrated a preferred embodiment of my invention, it will be understood that the same is capable of modification without departure from the scope of the appended claims.

What I claim is:

1. In a device of the kind described, a shank, a head on one end of said shank, a plurality of laterally spaced rows of parallel pick-up tines extending from said head longitudinally outwardly of said shank, a stripper element comprising spaced stripper rods each operating between a separate pair of rows of said tines and slidably carried by said head, a handle pivoted to the other end of said shank, means on said shank for limiting pivotal movements of said handle, and means connecting said stripper rods with said handle whereby pivotal movements of said handle impart movements to said stripper rods longitudinally of said shank.

2. In a device of the class described, a shank, a head on one end of said shank, a plurality of laterally-spaced rows of parallel pick-up tines extending outwardly of said head longitudinally of said shank, a pair of laterally-extending stripper rods having upturned free end portions slidably carried by said head, said stripper rods operating each between adjacent rows of said tines, a handle mounted for limited pivotal movements on the other end of said shank, said stripper rods having their other ends secured to said handle, whereby pivotal movements of the handle impart movements to said stripper rods longitudinally of said shank, said stripper rods being integrally formed from a single length of resilient wire bent backward upon itself to provide a U-shaped member.

FRANK GROSS.

REFERENCES CITED

The following references are of record in the file of this patent:

UNITED STATES PATENTS

| Number | Name | Date |
|---|---|---|
| 390,049 | White | Sept. 25, 1888 |
| 1,483,445 | Holton | Feb. 12, 1924 |